United States Patent
Huang et al.

(10) Patent No.: US 12,129,930 B2
(45) Date of Patent: Oct. 29, 2024

(54) NUT, ELECTRONIC EXPANSION VALVE AND STOP STRUCTURE THEREOF, AND REFRIGERATION DEVICE

(71) Applicant: GUANGDONG MEIZHI COMPRESSOR CO., LTD., Guangdong (CN)

(72) Inventors: Longhua Huang, Guangdong (CN); Chao Chen, Guangdong (CN); Mao Yang, Guangdong (CN); Bo Jiang, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 239 days.

(21) Appl. No.: 17/749,432

(22) Filed: May 20, 2022

(65) Prior Publication Data

US 2022/0275868 A1    Sep. 1, 2022

Related U.S. Application Data

(63) Continuation of application No. PCT/CN2021/121790, filed on Sep. 29, 2021.

(30) Foreign Application Priority Data

Dec. 14, 2020    (CN) .......................... 202023026394.8

(51) Int. Cl.
  *F16K 1/52*    (2006.01)
  *F16K 27/02*    (2006.01)
  *F25B 41/345*    (2021.01)

(52) U.S. Cl.
  CPC ............ *F16K 1/523* (2013.01); *F16K 27/029* (2013.01); *F25B 41/345* (2021.01)

(58) Field of Classification Search
  CPC ........ F16K 1/523; F16K 27/029; F16K 31/04; F16K 31/50; F25B 41/345; F25B 41/35; Y02B 30/70
  See application file for complete search history.

(56) References Cited

U.S. PATENT DOCUMENTS

| | | | |
|---|---|---|---|
| 8,556,229 B2 * | 10/2013 | Lv | F16K 31/047 251/264 |
| 9,541,315 B2 * | 1/2017 | Zhan | F25B 41/35 |
| 9,689,595 B2 * | 6/2017 | Zhan | F25B 41/38 |

FOREIGN PATENT DOCUMENTS

| | | |
|---|---|---|
| CN | 102454819 A | 5/2012 |
| CN | 103375624 A | 10/2013 |

(Continued)

OTHER PUBLICATIONS

International Search Report dated Nov. 15, 2021 received in International Application No. PCT/CN2021/121790 together with an English language translation.

(Continued)

*Primary Examiner* — John Bastianelli
(74) *Attorney, Agent, or Firm* — Scully, Scott, Murphy & Presser, P.C.

(57) ABSTRACT

A nut, an electronic expansion valve, a stop structure of the electronic expansion valve, and a refrigeration device are provided. The nut has a pipe body and a connection seat. An outer peripheral wall of a first end of the pipe body is provided with a limiting snap protrusion. The connection seat is connected to the first end of the pipe body. A first avoidance interval is provided between the limiting snap protrusion and the connection seat for installing a first stop of the spring guide rail.

10 Claims, 11 Drawing Sheets

(56) References Cited

FOREIGN PATENT DOCUMENTS

| | | |
|---|---|---|
| CN | 105333197 A | 2/2016 |
| CN | 106246983 B | 9/2019 |
| CN | 112524260 A | 3/2021 |
| CN | 113294528 A | 8/2021 |
| CN | 214197319 U | 9/2021 |
| CN | 113551048 A | 10/2021 |
| JP | S5989875 A | 5/1984 |
| JP | 2012533718 A | 12/2012 |

OTHER PUBLICATIONS

Notice of Reasons for Refusal dated Aug. 22, 2023 received in Japanese Patent Application No. JP 2022-537216.
Supplementary European Search Report dated Jan. 5, 2023 received in European Patent Application No. EP 21887888.2.

* cited by examiner

NUT, ELECTRONIC EXPANSION VALVE AND STOP STRUCTURE THEREOF, AND REFRIGERATION DEVICE

CROSS-REFERENCE TO RELATED APPLICATIONS

This application is a continuation application of PCT International Application No. PCT/CN2021/121790, filed on Sep. 29, 2021, which claims priority to and benefits of Chinese Application No. 202023026394.8, filed on Dec. 14, 2020, the entire contents of which are incorporated herein by reference for all purposes. No new matter has been introduced.

FIELD

The present disclosure relates to the field of solenoid valves, and in particular, to a nut, an electronic expansion valve and a stop structure thereof, and a refrigeration device.

BACKGROUND

In the related art, the stop structure of the electronic expansion valve usually includes a nut with an internal thread, and a spring guide rail and a slip ring that are both sleeved on the nut. The lower end of the spring guide rail has a first stop extending in the axial direction, and the lower end of the first stop is clamped with a metal connecting piece provided in the middle of the connection seat at the lower end of the nut. However, when the slip ring moves along the spring guide rail, the slip ring will exert a certain impact on the spring guide rail, and thus the spring guide rail is prone to being loosened after a long time of use.

SUMMARY

The main purpose of the present disclosure is to at least provide a nut and a stop structure with the nut, which aims to at least solve the problem of easy loosening of the spring guide rail in the related art.

In order to achieve the above objective, the present disclosure provides a nut, applied to a stop structure of an electronic expansion valve, the stop structure includes a spring guide rail, the nut includes:
 a pipe body, an outer peripheral wall of a first end of the pipe body being provided with a limiting snap protrusion; and
 a connection seat connected to the first end of the pipe body, a first avoidance interval being provided between the limiting snap protrusion and the connection seat for installing a first stop of the spring guide rail.

In an embodiment, one end of the connection seat connected to the pipe body is provided with an extension portion extending toward the pipe body, the extension portion is staggered from the limiting snap protrusion, a second avoidance interval and a third avoidance interval are respectively distributed on two sides of a circumferential direction of the limiting snap protrusion, and the first avoidance interval is integrated with the second avoidance interval and the third avoidance interval to form a U-shaped limiting groove for limiting the first stop.

In an embodiment, the limiting snap protrusion protrudes out of the extension portion in a direction toward a second end of the pipe body.

In an embodiment, the outer peripheral wall of the first end of the pipe body is further provided with a blocking protrusion, and the blocking protrusion and the limiting snap protrusion are spaced apart in a circumferential direction of the nut, to limit the first stop in the circumferential direction.

In an embodiment, at least a part of a peripheral surface of the limiting snap protrusion is inclined in a direction away from the second end of the pipe body and in a direction away from a centerline of the pipe body.

In an embodiment, a limiting groove is provided on a side face of the limiting snap protrusion away from the second end of the pipe body.

In an embodiment, a free end of the limiting snap protrusion is provided with a limiting protrusion protruding in a direction away from a second end of the pipe body, to form a slot between the limiting protrusion and the outer peripheral wall of the pipe body.

In an embodiment, a side surface of the limiting snap protrusion away from the second end of the pipe body is inclined in a circumferential direction of the nut.

The present disclosure further provides a stop structure for an electronic expansion valve, the stop structure includes:
 the nut as described above; and
 a spring guide rail.

The spring guide rail includes a guide portion sleeved on the pipe body, and a first stop provided at one end of the guide portion, the first stop includes a first axial segment connected to the guide portion, and a first circumferential segment connected to a tail end of the first axial segment, the first axial segment extends along a length direction of the nut, the first circumferential segment extends along the circumferential direction of the nut, the first axial segment is located on one side of the limiting snap protrusion, and the first circumferential segment is located in the first avoidance interval and abuts on a side surface of the limiting snap protrusion away from a second end of the pipe body.

In an embodiment, the first stop further includes a second axial segment connected to a tail end of the first circumferential segment. The second axial segment extends towards the second end of the pipe body, and is located on another side of the limiting snap protrusion.

In an embodiment, the first stop further includes a second circumferential segment connected to a tail end of the second axial segment. The second circumferential segment extends along the circumferential direction of the nut. The second circumferential segment is located on a side of the limiting snap protrusion toward the second end of the pipe body, and a tail end of the second circumferential segment is connected to the first axial segment and/or the guide portion.

In an embodiment, a side surface of the limiting snap protrusion toward the second end of the pipe body is close to a start end of the first axial segment along the length direction of the nut.

The present disclosure further provides an electronic expansion valve, including the stop structure of the electronic expansion valve as described above.

The present disclosure further provides a refrigeration device, including the electronic expansion valve as described above.

In the present disclosure, the limiting snap protrusion is provided at one end of the pipe body close to the connection seat for installing the first stop of the spring guide rail, such that the first stop does not need to extend to the metal connecting piece on the connection seat for fixing, and the axial extension length of the first stop can be shortened, which can improve the impact resistance of the first stop, so that the first stop is not easy to be displaced or deformed.

Therefore, the loosening of the spring guide rail can be prevented, and the coaxiality of the guide portion of the spring guide rail and the pipe body can be ensured, thereby improving the reliability of the stop structure.

BRIEF DESCRIPTION OF THE DRAWINGS

In order to more clearly illustrate the embodiments of the present disclosure or the technical solutions in the prior art, the following briefly introduces the accompanying drawings that need to be used in the description of the embodiments or the prior art. Obviously, the drawings in the following description are only some embodiments of the present disclosure. For those of ordinary skill in the art, other drawings can also be obtained based on the structures shown in these drawings without any creative effort.

Description of reference signs shown in the figures is provided in the following table.

| reference sign | name | reference sign | name |
| --- | --- | --- | --- |
| 100 | stop structure | 223 | second axial segment |
| 10 | nut | 224 | second circumferential segment |
| 11 | pipe body | 23 | second stop |
| 111 | limiting snap protrusion | 30 | slip ring |
| 112 | blocking protrusion | a1 | first avoidance interval |
| 12 | connection seat | a2 | second avoidance interval |
| 13 | extension portion | a3 | third avoidance interval |
| 20 | spring guide rail | 1000 | electronic expansion valve |
| 21 | guide portion | 200 | valve casing |
| 22 | first stop | 210 | casing |
| 221 | first axial segment | 220 | valve seat |
| 222 | first circumferential segment | 300 | metal connecting piece |

The realization of the objective, functional characteristics, and advantages of the present disclosure are further described with reference to the accompanying drawings.

DETAILED DESCRIPTION OF EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature.

Besides, the meaning of "and/or" appearing in the disclosure includes three parallel scenarios. For example, "A and/or B" includes only A, or only B, or both A and B.

The present disclosure provides a nut, a stop structure with the nut, and an electronic expansion valve with the stop structure. As shown in FIGS. 1-6 and 9, the electronic expansion valve 1000 includes a stop structure 100; the stop structure 100 includes a nut 10, a spring guide rail 20 and a slip ring 30; and the spring guide rail 20 and the slip ring 30 are screwed together and subsequently sleeved on the nut 10.

In an embodiment of the present disclosure, as shown in FIG. 1 to FIG. 7, the nut 10 includes a pipe body 11 and a connection seat 12. An outer peripheral wall of a first end of the pipe body 11 is provided with a limiting snap protrusion 111. The connection seat 12 is connected to the first end of the pipe body 11, and a first avoidance interval a1 is provided between the limiting snap protrusion 111 and the connection seat 12 for installing a first stop 22 of the spring guide rail 20.

Figure 2:
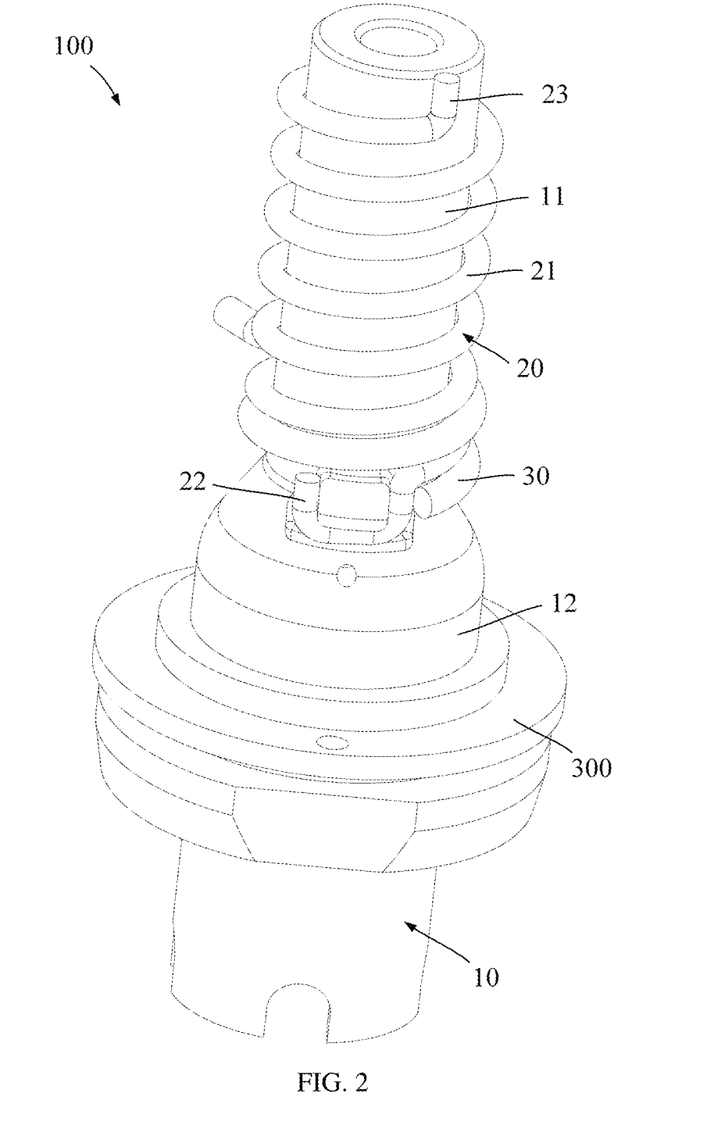
FIG. 2 is a schematic structural view of a stop structure of the electronic expansion valve in FIG. 1 from a perspective.
Figure 3:
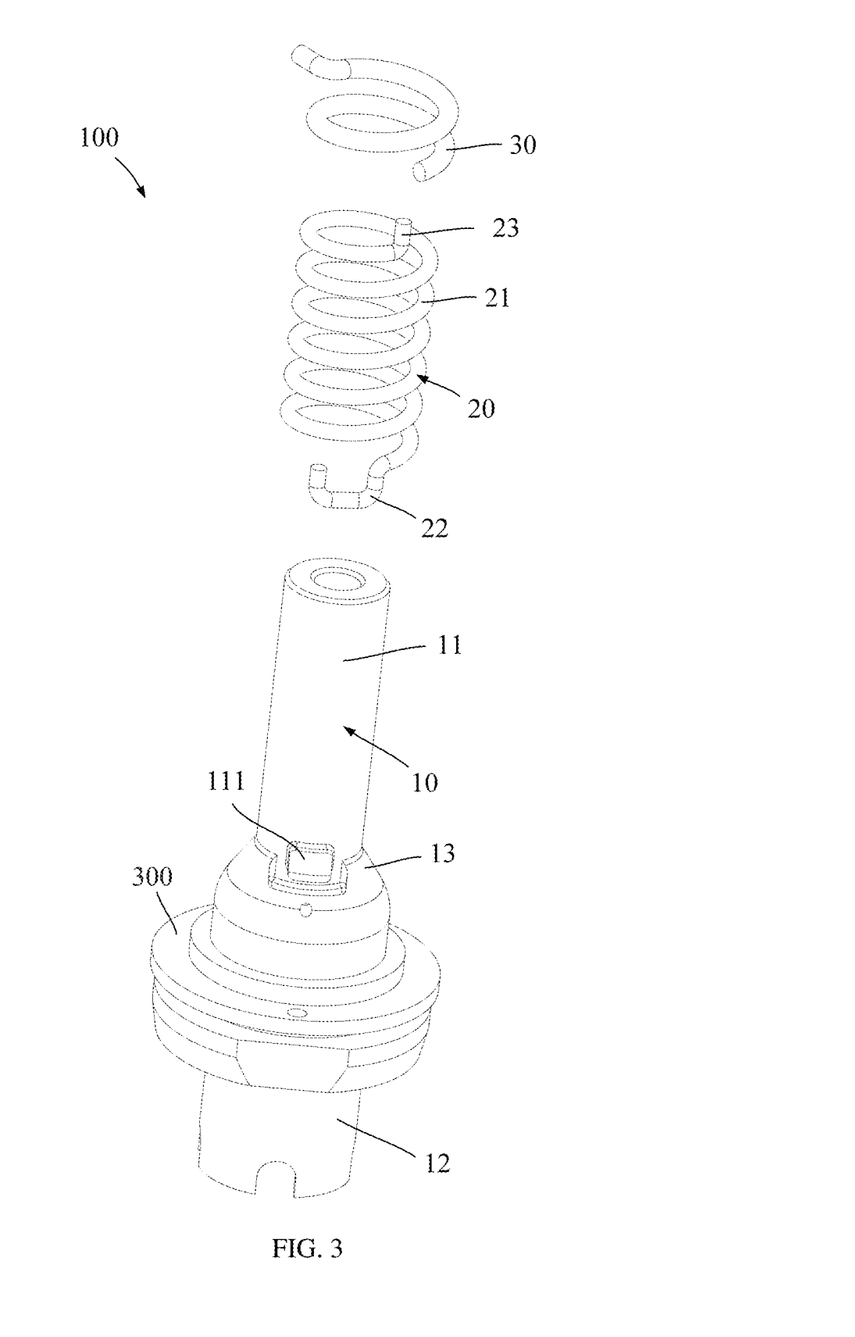
FIG. 3 is an exploded schematic view of the stop structure in FIG. 2.
Figure 4:
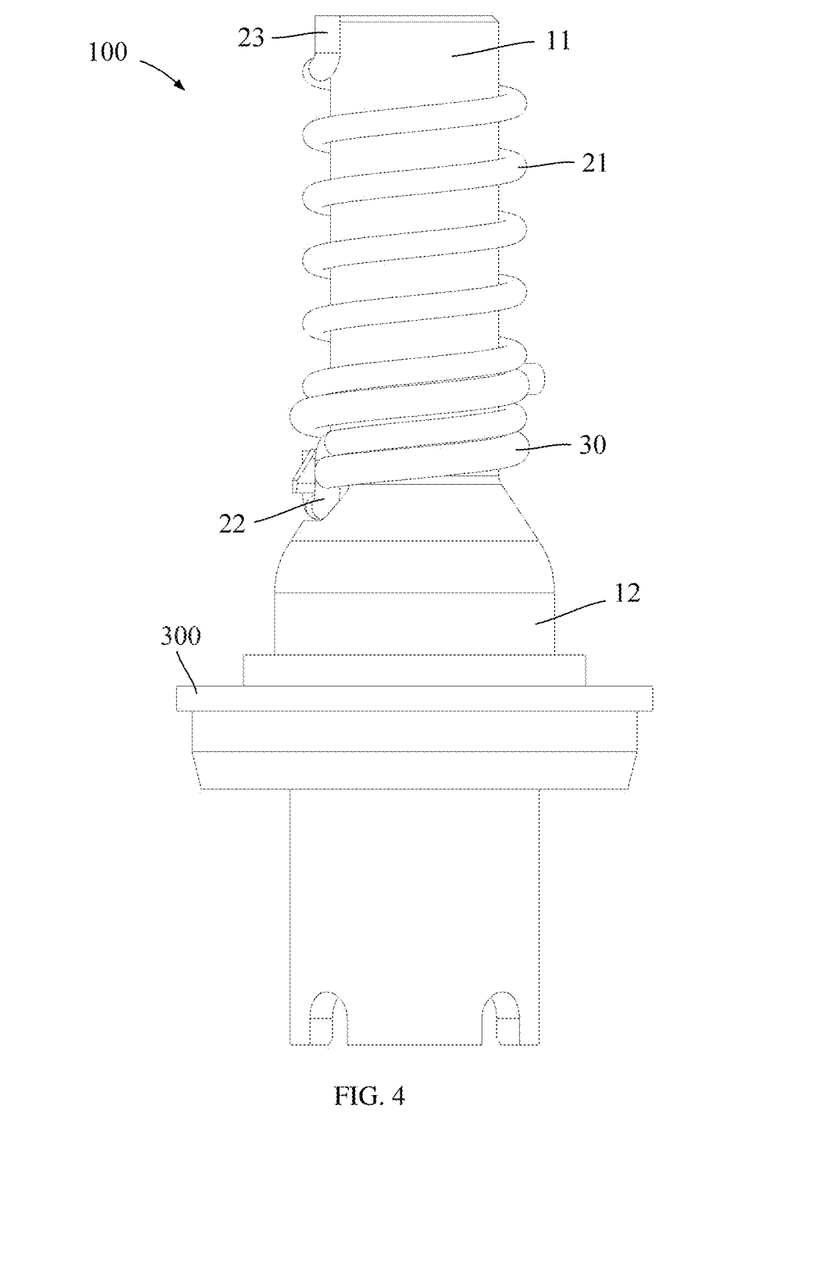
FIG. 4 is a side view of the stop structure in FIG. 2.
Figure 5:
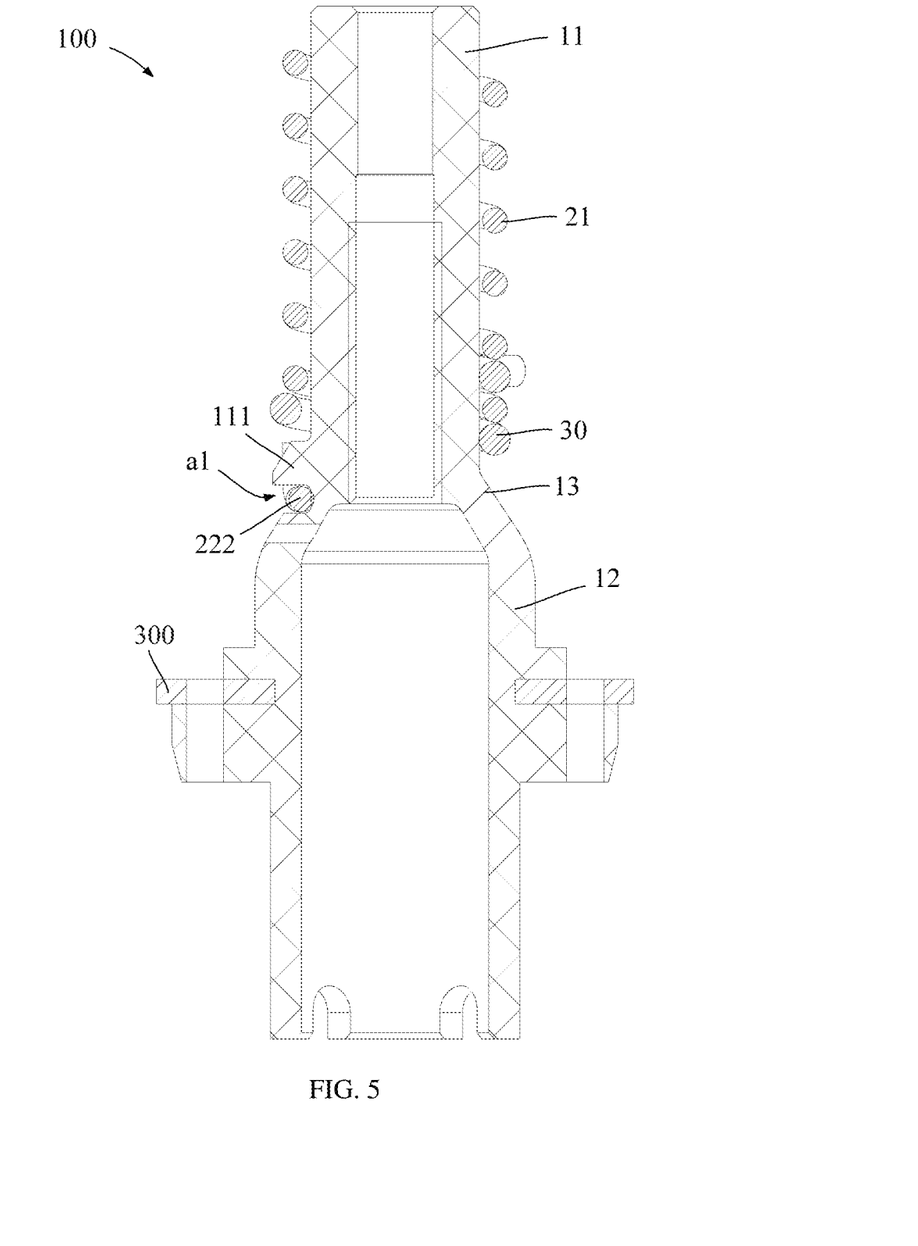
FIG. 5 is a sectional view of the stop structure in FIG. 2.
Figure 7:
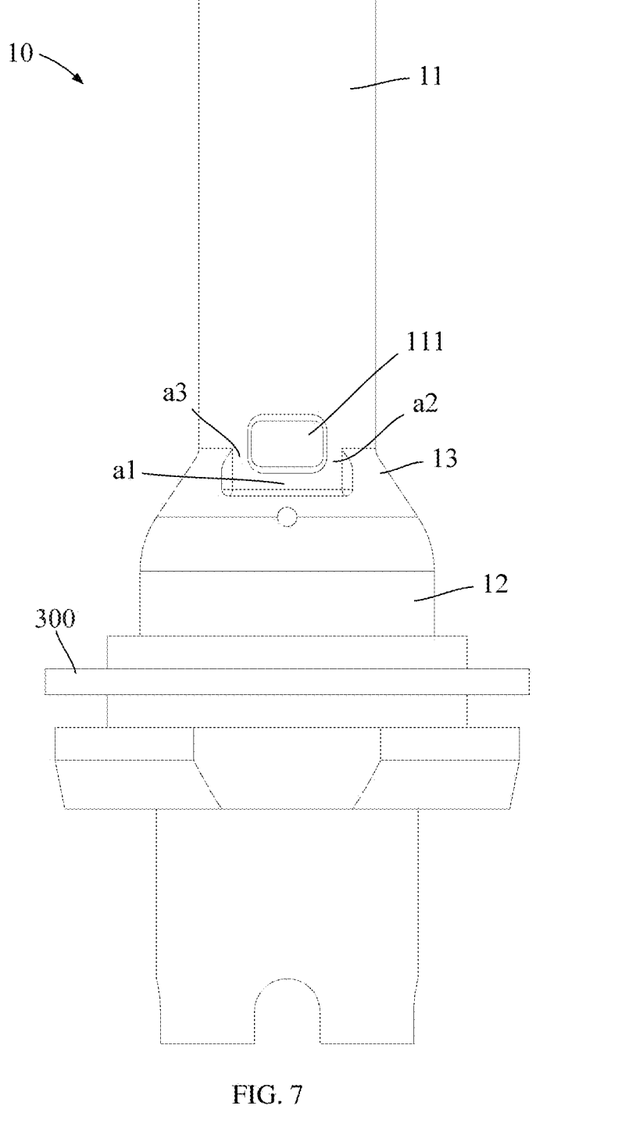
FIG. 7 is a schematic structural view of a nut in FIG. 2.
Figure 8:
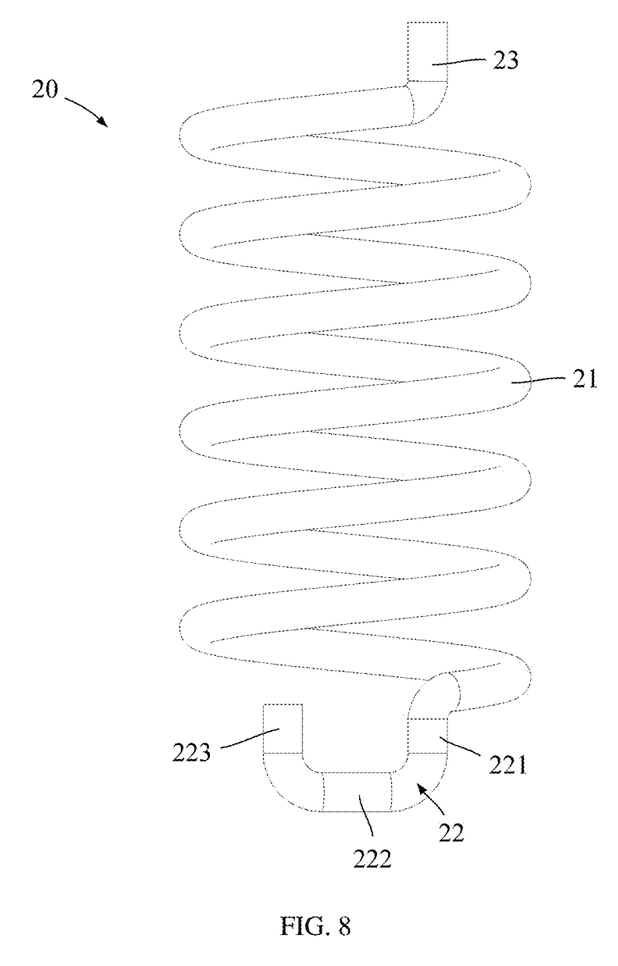
FIG. 8 is a schematic structural view of a spring guide rail in FIG. 2.
Figure 9:
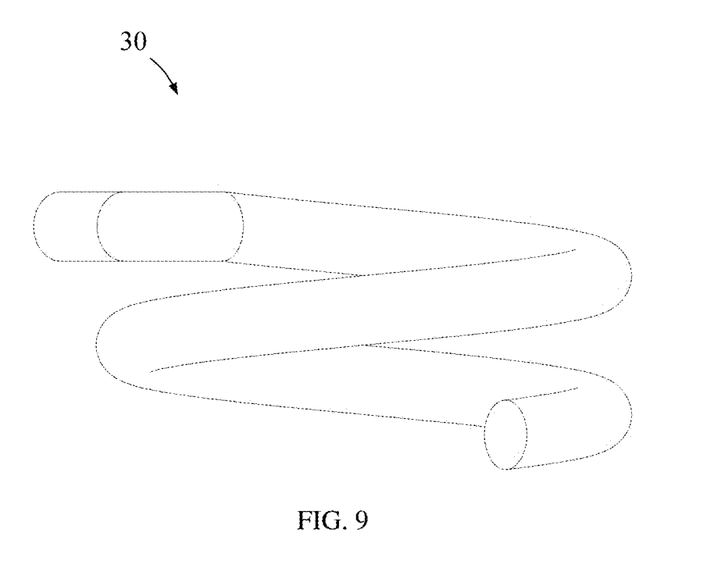
FIG. 9 is a schematic structural view of a slip ring in FIG. 2.

In the state shown in FIG. 2 and FIG. 7, the connection seat 12 is provided at the lower end (i.e., the first end) of the pipe body 11, and the limiting snap protrusion 111 is provided at the lower end of the outer peripheral wall of the pipe body 11.

For example, the pipe body 11 has an internal thread, and the outer diameter or equivalent outer diameter of the connection seat 12 is larger than the outer diameter or equivalent outer diameter of the pipe body 11. A stepped structure is formed between the connection seat 12 and the pipe body 11. The inner diameter or equivalent inner diameter of the connection seat 12 is larger than the inner diameter or equivalent inner diameter of the pipe body 11.

In addition, in order to facilitate the description of the present disclosure, the detailed description of the stop structure 100 will be provided with reference to the state shown in FIG. 2 and FIG. 7; however it should be noted that it is not intended to limit the present disclosure.

As shown in FIGS. 1 to 6 and 8, the spring guide rail 20 includes a guide portion 21 sleeved outside the pipe body 11, and a first stop 22 provided at one end of the guide portion 21. The first stop 22 includes a first axial segment 221 connected to the guide portion 21, and a first circumferential segment 222 connected to a tail end of the first axial segment 221. The first axial segment 221 extends along a length direction of the nut 10 (toward a direction away from the second end of the pipe body 11). The first circumferential segment 222 extends along the circumferential direction of the nut 10. The first axial segment 221 is located on one side of the limiting snap protrusion 111, and the first circumferential segment 222 is located in the first avoidance interval a1 and abuts on the side surface of the limiting snap protrusion 111 away from the second end of the pipe body. In other words, the first circumferential segment 222 hooks on the limiting snap protrusion 111 to limit the sliding of the spring guide rail 20 in the direction close to the second end of the pipe body 11.

In the state shown in FIG. 2, the first axial segment 221 is located on the right side of the limiting snap protrusion 111 and abuts against the right side of the limiting snap protrusion 111 to enhance the compactness of the structure.

For example, the slip ring 30 and the guide portion 21 are nested and screwed to each other, and the slip ring 30 can slide along the guide portion 21 in the length direction of the nut 10.

For example, one end of the guide portion 21 toward the connection seat 12 is spaced from the connection seat 12 along the length direction of the nut 10.

It can be understood that the first axial segment 221 is located on the downward stroke of the slip ring 30 (the downward movement of the slip ring 30 means that the slip ring 30 slides toward the first end of the pipe body 11). When the slip ring 30 goes down, the end of the slip ring 30 toward the connection seat 12 can abut against the first axial segment 221, so as to limit the down movement of the slip ring 30 and achieve the stopping of slip ring 30 in the downward direction. One end of the slip ring 30 toward the connection seat 12 abuts against the side of the first axial segment 221 away from the limiting snap protrusion 111. It should be pointed out that, if the first axial segment 221 abuts on the right side surface of the limiting snap protrusion 111, the impact of the impact force of the slip ring 30 on the first stop 22 can be further reduced.

In the present disclosure, the limiting snap protrusion 111 is provided at one end of the pipe body 11 close to the connection seat 12 for installing the first stop 22 of the spring guide rail 20, such that the first stop 22 does not need to extend to the metal connecting piece 300 on the connection seat 12 for fixing, and the axial extension length of the first stop 22 can be shortened, which can improve the impact resistance of the first stop 22, so that the first stop 22 is less prone to displacement or deformation. Therefore, the loosening of the spring guide rail 20 can be prevented, and the coaxiality of the guide portion of the spring guide rail 20 and the pipe body 11 can be ensured, thereby improving the reliability of the stop structure 100.

Depending on the circumstances of application, the limiting snap protrusion 111 can be set in a relatively regular shape such as a circle, a rectangle, or a trapezoid, or can be set in an irregular shape, as long as it can cooperate with the first stop 22. Setting the limiting snap protrusion 111 to a relatively regular shape, such as a circle, a rectangle, or a trapezoid, can facilitate design and production. The following description will mainly take the setting of the limiting snap protrusion 111 as a rectangle as an example for description. It should be noted that, the above shape refers to the projected shape of the limiting snap protrusion 111 on the peripheral surface of the pipe body 11.

Further, as shown in FIG. 7, one end of the connection seat 12 connected to the pipe body 11 is provided with an extension portion 13 extending toward the pipe body 11, the extension portion 13 is staggered from the limiting snap protrusion 111, a second avoidance interval a2 and a third avoidance interval a3 are respectively formed on both sides of a circumferential direction of the limiting snap protrusion 111, and the first avoidance interval a1 is integrated with the second avoidance interval a2 and the third avoidance interval a3 to form a U-shaped limiting groove for limiting the first stop 22.

As shown in FIG. 2 and FIG. 4 to FIG. 6, the first circumferential segment 222 is adapted to be arranged within the first avoidance interval a1. In this way, the first circumferential segment 222 can be limited within the first avoidance interval a1, so as to realize the axial limit of the spring guide rail 20.

Figure 6:
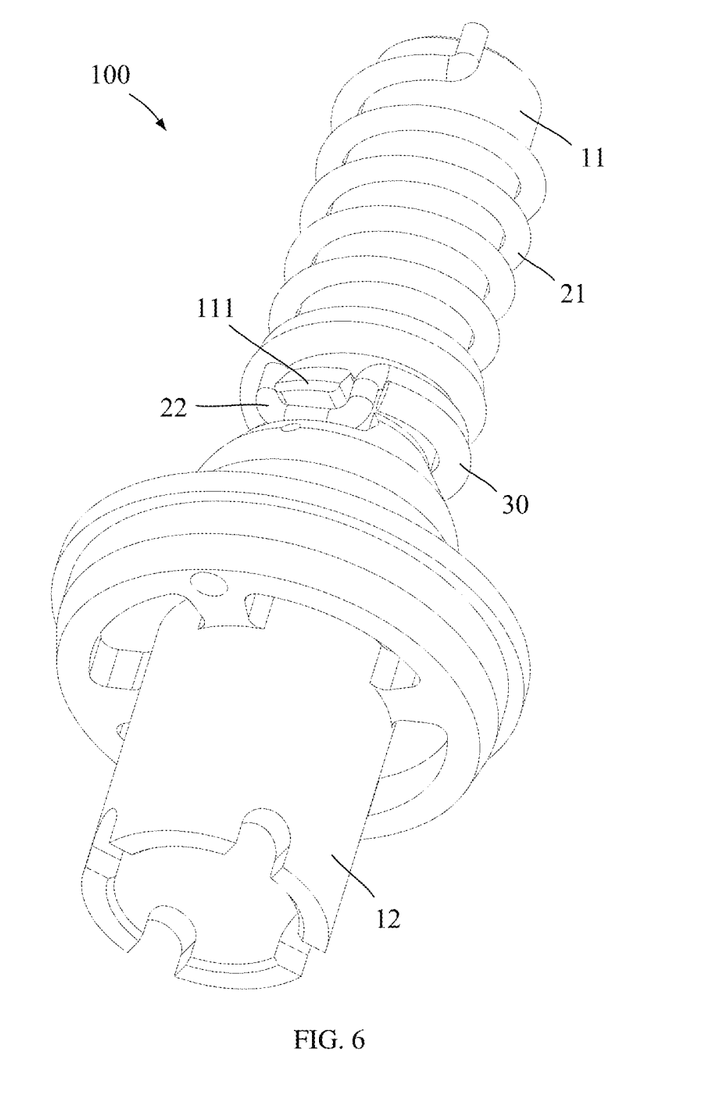
FIG. 6 is a schematic structural view of the stop structure in FIG. 2 from another perspective.

For example, as shown in FIG. 2 and FIG. 6, the first axial segment 221 is adapted to be arranged in the second avoidance interval a2 or the third avoidance interval a3, so that the first axial segment 221 can be limited, thereby realizing the circumferential limitation of the spring guide rail 20.

In this way, through the above structure arrangement, the circumferential and axial positions of the spring guide rail 20 can be achieved, and the impact resistance of the first stop 22 can be further improved, thereby improving the installation stability of the spring guide rail 20.

During assembly, the first stop 22 only needs to be opened by an external force, so that the first circumferential segment 222 passes over the limiting snap protrusion 111, and subsequently resets under the elastic force of the first stop 22 itself. The first circumferential segment 222 is snapped into the first avoidance interval a1, and the first axial segment 221 is snapped into the second avoidance interval a2 or the third avoidance interval a3.

Further, as shown in FIG. 7, the limiting snap protrusion 111 protrudes from the extension portion 13 in the direction toward the second end of the pipe body 11. In this way, when the slip ring 30 goes down, the abutment between the lower end of the slip ring 30 and the first axial segment 221 corresponds to the portion of the limiting snap protrusion 111 protruding from the extension portion 13, so that the impact on the first axial segment 221 can be reduced.

For example, the outer peripheral surface of the extension portion 13 is configured as a cone torus surface or an arc torus surface. In one embodiment, the outer peripheral surface of the end of the connection seat 12 connected to the pipe body 11 is set as a cone torus surface or an arc torus surface.

Further, as shown in FIG. 2, the side surface of the limiting snap protrusion 111 toward the second end of the pipe body 11 is close to the start end of the first axial segment 221 in the length direction of the nut 10. That is to say, the side surface of the limiting snap protrusion 111 toward the second end of the pipe body 11 is disposed close to the start end of the first axial segment 221 in the length direction of the nut 10. In this way, the length of the first axial segment 221 can be shortened, and the structure compactness and impact resistance can be improved.

Further, at least a part of the peripheral surface of the limiting snap protrusion 111 is inclined in a direction away from the second end of the pipe body 11 and in a direction away from the centerline of the pipe body 11. In other words, the thickness of the limiting snap protrusion 111 is at least partially increased in the direction away from the second end of the pipe body 11. In this way, when the spring guide rail 20 is installed, the first circumferential segment 222 can be guided to slide in a direction away from the second end of the pipe body 11, thereby reducing the difficulty of assembly.

Further, as shown in FIGS. 1-6 and 8, the first stop 22 further includes a second axial segment 223 connected to the end of the first circumferential segment 222. The second axial segment 223 extends in a direction close to the second end of the pipe body 11 and is located on the other side of the limiting snap protrusion 111.

For example, one of the first axial segment 221 and the second axial segment 223 is fitted within the second avoidance interval a2, and the other is fitted within the third avoidance interval a3.

In this way, the connection stability and reliability of the first stop 22 can be further improved, so as to further reduce the risk of loosening.

Further, the ratio of the length of the second axial segment 223 to the width of the limiting snap protrusion 111 in the length direction of the nut 10 is greater than or equal to ¼. In this way, the second axial segment 223 can be guaranteed to have a certain impact capacity.

In the present embodiment, as shown in FIGS. 1-6 and 8, the length of the second axial segment 223 is equivalent to the width of the limiting snap protrusion 111 in the length direction of the nut 10.

Figure 10:
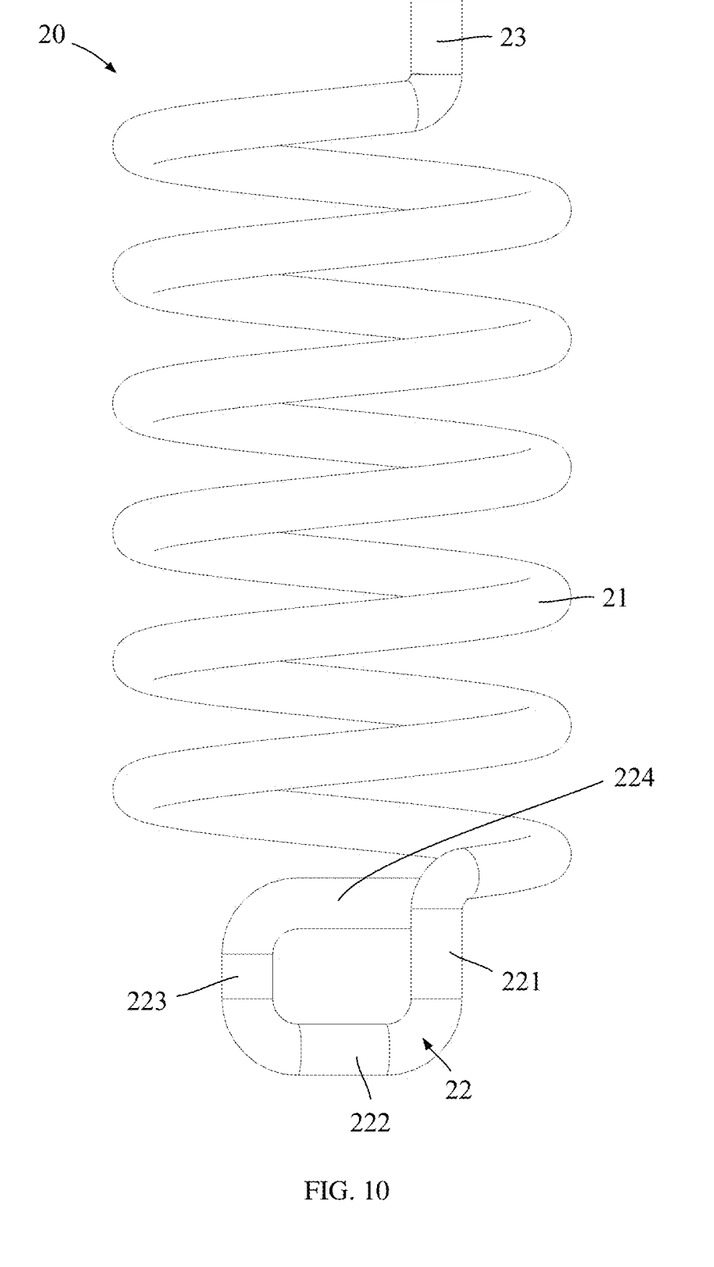
FIG. 10 is a schematic structural view of the spring guide rail of the electronic expansion valve according to another embodiment of the present disclosure.

In another embodiment of the present disclosure, as shown in FIG. 10, in order to further improve the connection stability of the first stop 22, the first stop 22 further includes a second circumferential segment 224 connected to the end of the second axial segment 223. The second circumferential segment 224 extends along the circumferential direction of the nut 10. The second circumferential segment 224 is located on the side of the limiting snap protrusion 111 toward the second end of the pipe body 11. The end of the second circumferential segment 224 is connected to the first axial segment 221 and/or the guide portion 21. In this way, the structural strength of the first stop 22 can be improved, so as to further improve the installation stability and impact resistance of the first stop 22.

It should be noted that in other embodiments, the connection stability of the first stop 22 can also be improved by other forms. For example, in some embodiments, a limiting groove can be provided on the side surface of the limiting snap protrusion 111 away from the second end of the pipe body 11, and the first circumferential segment 222 is snapped into the limiting groove. In another embodiment, the free end (that is, the end away from the center line of the pipe body 11) of the limiting snap protrusion 111 is provided with a limiting protrusion protruding in the direction away from the second end of the pipe body 11. A clamping groove is formed between the limiting protrusion and the outer peripheral wall of the pipe body 11, and the first circumferential segment 222 is clamped in the clamping groove. In some other embodiments, the side surface of the limiting snap protrusion 111 away from the second end of the pipe body 11 is inclined in the circumferential direction of the nut 10. The first circumferential segment 222 is inclined in a direction away from the first axial segment 221 and is inclined in a direction close to the second end of the pipe body 11. The first circumferential segment 222 is adapted to abut against the side surface of the limiting snap protrusion 111 away from the second end of the pipe body 11.

It should be pointed out that the above structural forms for improving the connection stability of the first stop 22 can be used alone or selectively in combination with each other.

It should be noted that, in other embodiments of the present disclosure, the circumferential limit may also be formed on the first stop 22 and the spring guide rail 20 in other ways.

Figure 11:
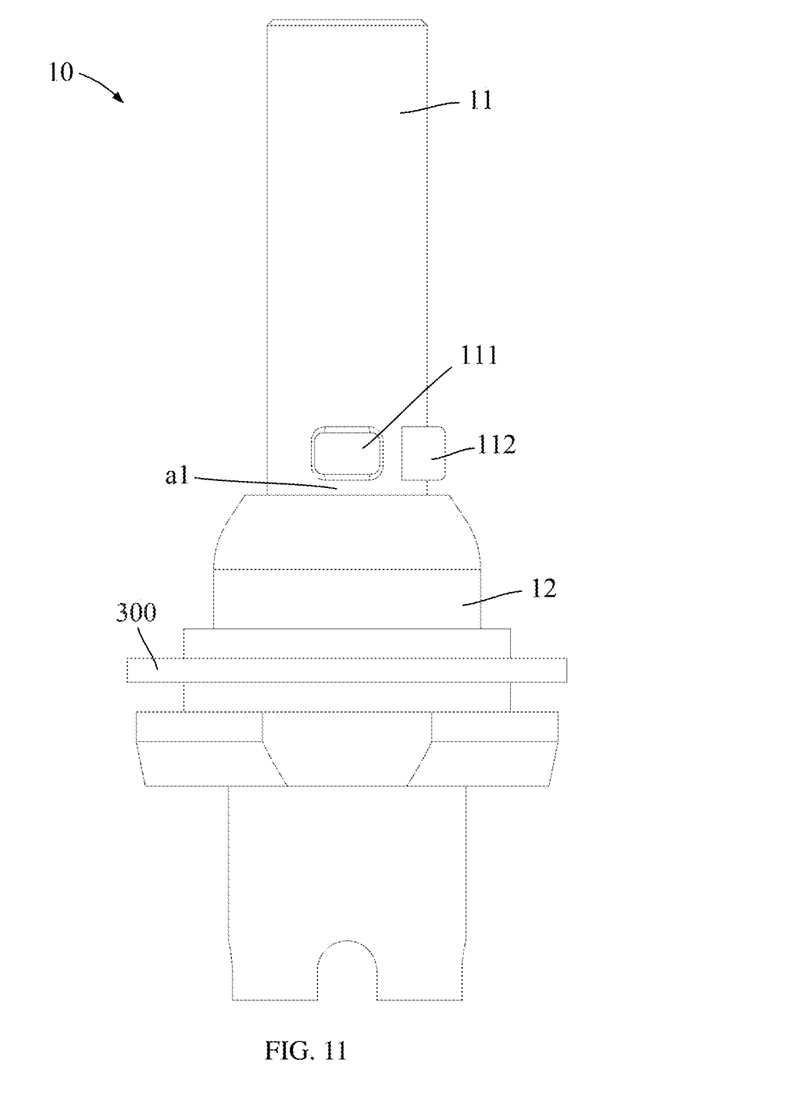
FIG. 11 is a schematic structural view of the nut of the electronic expansion valve according to another embodiment of the present disclosure.

In certain other embodiments of the present disclosure, as shown in FIG. 11, the outer peripheral wall of the first end of the pipe body 11 is further provided with a blocking protrusion 112. The blocking protrusions 112 and the limiting snap protrusions 111 are spaced apart in the circumferential direction of the nut 10. The first axial segment 221 is clamped between the limiting snap protrusion 111 and the blocking protrusion 112, so as to limit the first stop 22 and the spring guide rail 20 in the circumferential direction. The slip ring 30 can abut against the other side of the blocking protrusion 112 or abut against the first axial segment 221 when it descends.

In this embodiment, the other limitations of the limiting snap protrusion 111 and the first stop 22 can be referred to the above embodiments, and it is unnecessary to repeat them here.

In certain other embodiments of the present disclosure, the first stop 22 at least includes a first axial segment 221, a first circumferential segment 222 and a second axial segment 223, so as to be respectively disposed on at least three sides of the limiting snap protrusion 111 to realize circumferential limiting of the first stop 22 and the spring guide rail 20. In addition, the slip ring 30 can abut against the first axial segment 221 when it descends. In this embodiment, it is not necessary to provide the extension portion 13 and the blocking portion.

In one embodiment, the first stop 22 includes a first axial segment 221, a first circumferential segment 222, a second axial segment 223 and a second circumferential segment 224, which are respectively disposed on four sides of the limiting snap protrusion 111.

In this embodiment, the other limitations of the limiting snap protrusion 111 and the first stop 22 can be referred to the above embodiments, and it is unnecessary to repeat them here.

Other structures of the electronic expansion valve 1000 are briefly described below.

Figure 1:
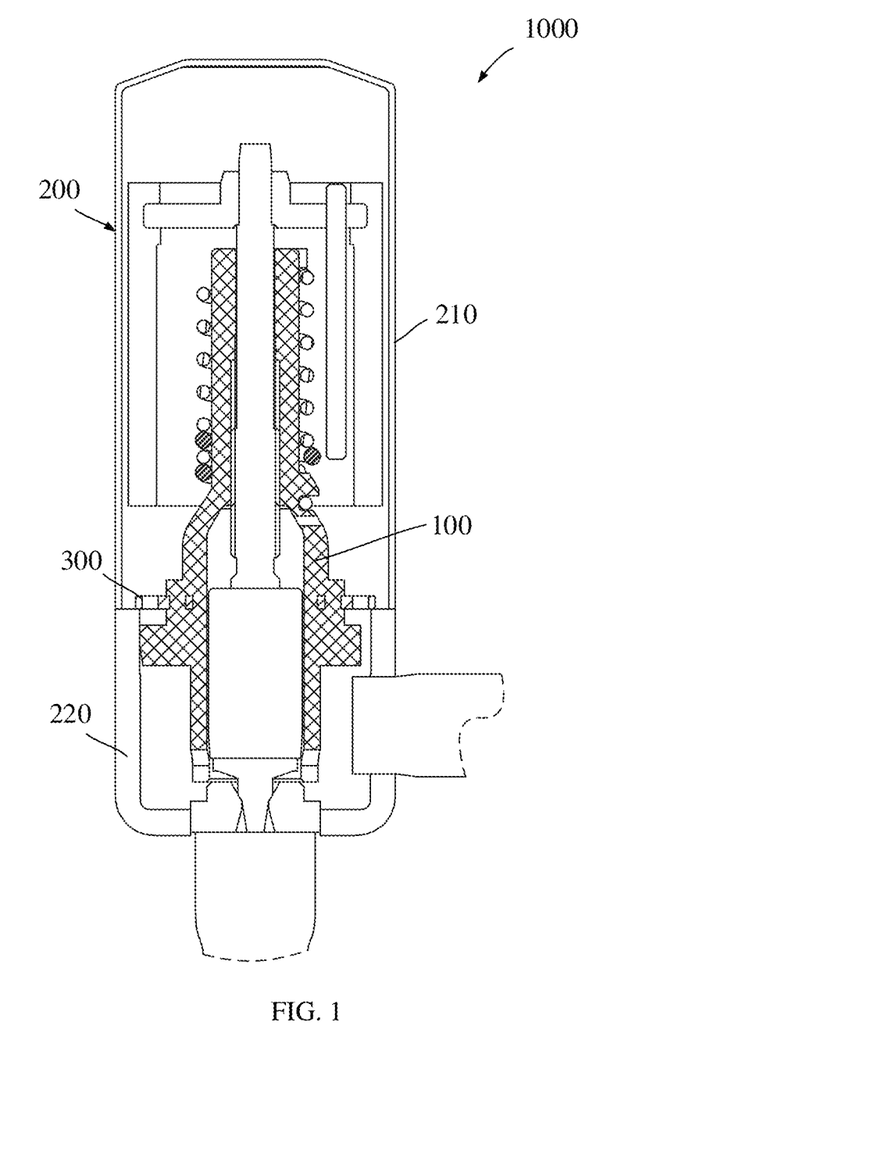
FIG. 1 is a schematic structural view of an electronic expansion valve according to an embodiment of the present disclosure.

Further, as shown in FIG. 1, the electronic expansion valve 1000 further includes a valve casing 200, the valve casing 200 includes a casing 210 and a valve seat 220, and the stop structure 100 is installed in the valve casing 200.

For example, the outer peripheral surface of the connection seat 12 is provided with a metal connecting piece 300, and the metal connecting piece 300 is connected to the valve seat 220. In one embodiment, the metal connecting piece 300 and the connection seat 12 are integrally injection-molded.

Further, as shown in FIG. 1 to FIG. 7, the spring guide rail 20 further includes a second stop 23. The slip ring 30 slides between the second stop 23 and the first stop 22 along the guide portion 21.

For example, the spring guide rail 20 generally adopts a cylindrical spring.

It can be understood that in the present disclosure, the stop structure 100 of the electronic expansion valve 1000 has a simple and compact structure, is easy to install, and can reduce the production cost of the electronic expansion valve.

The present disclosure also proposes a refrigeration device, the refrigeration device includes an electronic expansion valve, and the specific structure of the electronic expansion valve refers to the above-mentioned embodiment. Since the refrigeration device of the present disclosure adopts all the technical solutions of the above-mentioned embodiments, it has at least all the beneficial effects brought by the technical solutions of the above-mentioned embodiments, and will not be repeated here.

In an embodiment, the refrigeration device is an air conditioner, a refrigerator, or the like.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A stop structure for an electronic expansion valve, wherein the stop structure comprises:
   a nut comprising:
     a pipe body having a first end and a second end;
     a limiting snap protrusion protruding from an outer peripheral wall of the first end of the pipe body; and
     a connection seat connected to the first end of the pipe body,
     wherein a first avoidance interval is provided between the limiting snap protrusion and the connection seat; and
   a spring guide rail comprising:
     a guide portion sleeved on the pipe body; and
     a first stop provided at one end of the guide portion, wherein the first stop comprises:
       a first axial segment connected to the guide portion;
       a first circumferential segment connected to a tail end of the first axial segment;
       a second axial segment connected to a tail end of the first circumferential segment; and
       a second circumferential segment connected to a tail end of the second axial segment,
       wherein the first axial segment extends along a length direction of the nut, and is located on one side of the limiting snap protrusion,
       wherein the first circumferential segment extends along a circumferential direction of the nut,
       wherein the first circumferential segment is located in the first avoidance interval and abuts on a side surface of the limiting snap protrusion away from the second end of the pipe body,
       wherein the second axial segment extends towards the second end of the pipe body and is located on another side of the limiting snap protrusion,
       wherein the second circumferential segment extends along the circumferential direction of the nut, and is located on a side of the limiting snap protrusion towards the second end of the pipe body, and
       wherein a tail end of the second circumferential segment is connected to the first axial segment and/or the guide portion.

2. The stop structure of claim 1, wherein:
   the connection seat comprises an extension portion provided on one end of the connection seat connected to the pipe body, wherein the extension portion is provided to extend towards the pipe body;
   the extension portion is staggered from the limiting snap protrusion;
   a second avoidance interval and a third avoidance interval are respectively distributed on two sides of the circumferential direction of the limiting snap protrusion; and
   the first avoidance interval is integrated with the second avoidance interval and the third avoidance interval to form a U-shaped limiting groove for limiting the first stop.

3. The stop structure of claim 2, wherein the limiting snap protrusion protrudes out of the extension portion in a direction toward a second end of the pipe body.

4. The stop structure of claim 1, wherein:
   the nut further comprises a blocking protrusion protruding from the outer peripheral wall of the first end of the pipe body; and
   the blocking protrusion and the limiting snap protrusion are spaced apart in the circumferential direction of the nut, to limit the first stop in the circumferential direction.

5. The stop structure of claim 1, wherein at least a part of a peripheral surface of the limiting snap protrusion is inclined in a direction away from the second end of the pipe body and in a direction away from a centerline of the pipe body.

6. The stop structure of claim 1, wherein a free end of the limiting snap protrusion is provided with a limiting protrusion protruding in a direction away from a second end of the pipe body, to form a slot between the limiting protrusion and the outer peripheral wall of the pipe body.

7. The stop structure of claim 1, wherein a side surface of the limiting snap protrusion away from the second end of the pipe body is inclined in the circumferential direction of the nut.

8. The stop structure of claim 1, wherein a side surface of the limiting snap protrusion towards the second end of the pipe body abuts a start end of the first axial segment along the length direction of the nut.

9. An electronic expansion valve comprising the stop structure of the electronic expansion valve of claim 1.

10. A refrigeration device comprising the electronic expansion valve of claim 9.

* * * * *